No. 799,609. PATENTED SEPT. 12, 1905.
B. LUDWIG.
DEMONSTRATION PICTURE FOR MULTICOLORED PRINTING.
APPLICATION FILED AUG. 24, 1904.

Witnesses
Henry J. Suhrbier
W. Stockwell

Inventor
Bernhard Ludwig
By his Attorneys
Goepel & Niles

UNITED STATES PATENT OFFICE.

BERNHARD LUDWIG, OF NEW YORK, N. Y.

DEMONSTRATION-PICTURE FOR MULTICOLORED PRINTING.

No. 799,609.      Specification of Letters Patent.      Patented Sept. 12, 1905.

Application filed August 24, 1904. Serial No. 222,013.

*To all whom it may concern:*

Be it known that I, BERNHARD LUDWIG, a citizen of the United States, residing in New York, borough of Bronx, in the State of New York, have invented certain new and useful Improvements in Demonstration-Pictures for Multicolored Printing, of which the following is a specification.

This invention relates to an improved picture for demonstrating the fact, well known in physical science, that when a picture is printed in the three complementary colors yellow, red, and blue all the shades of different colors are produced.

The object of this invention is to demonstrate the blending of the complementary colors and the production of a multicolored picture therefrom in a very simple and effective manner, so that the demonstration-picture can be used for educational purposes, also for practical purposes in the arts; and the invention consists of a demonstration-picture for illustrating multicolor-printing comprising a suitable foundation-board and a plurality of superposed transparent flexible sheets printed in different complementary colors.

The invention also consists in other novel features to be hereinafter described and claimed.

Figure 1:
Figure 2:
Figure 3:
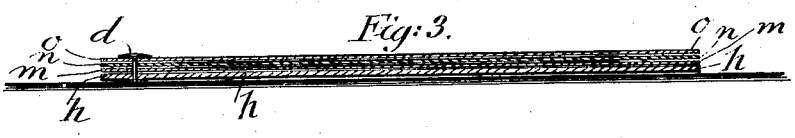
Figure 4:
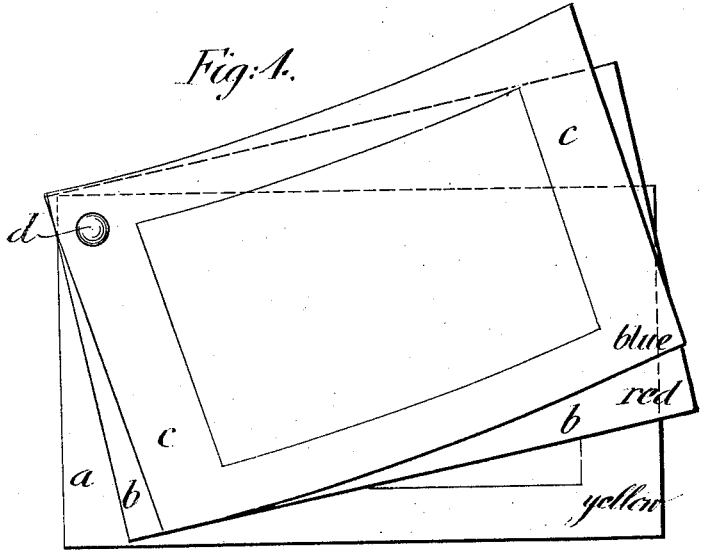

In the accompanying drawings, Figure 1 is a plan view of my improved demonstration-picture for multicolor-printing. Fig. 2 is a vertical longitudinal section of the picture, showing two superposed transparent sheets. Fig. 3 is a like section showing three superposed transparent sheets; and Fig. 4 is a plan view similar to Fig. 1, showing the several sheets placed out of register with each other.

Similar letters of reference indicate corresponding parts throughout the several views.

In making my improved demonstration-pictures the color-plates representing the three complementary colors yellow, red, and blue are first prepared in the well-known manner from colored negatives of the original pictures to be printed. From the yellow color-plate a print is made on a suitable foundation-board $a$, of pasteboard or similar flexible opaque material, while the remaining complementary colors are printed on transparent sheets $b$ and $c$, which are superposed in proper register above the foundation-board so that the three colors overlap each other and produce a multicolored picture with the delicate blending of the colors.

The superposed sheets of transparent material are attached to the foundation-board by a suitable fastening device $d$, so that the different complementary colors are placed in correct register with each other. This fastening device may consist of one or more fasteners of the type shown or any other fastening device by which the proper register of the color-plates is obtained. By lifting the transparent superposed sheets away from each other and from the foundation-board the three prints, each in its own color, can be readily inspected, while the complete multicolored picture is produced by superposing the sheets and blending the different colors into the picture that has been reproduced.

The foundation-board is preferably made of white pasteboard, as stated, and the superposed transparent plates of celluloid, gelatin, or other transparent flexible material.

Instead of using a foundation-board and two superposed transparent sheets an entirely white foundation-board $h$ and three superposed transparent color-sheets $m$ $n$ $o$ may be used, as shown in Fig. 3. In any case the fact that a multicolored picture of great delicacy in coloring is produced by the blending of three pictures, each made in individual and complementary colors, can be readily demonstrated to the eye.

Having thus described my invention, I claim as new and desire to secure by Letters Patent—

1. A demonstration-picture for multicolor-printing, comprising a foundation-board, and a plurality of superposed transparent flexible sheets printed in different complementary colors.

2. A demonstration-picture for multicolor-printing, comprising an opaque foundation-board, and a plurality of superposed transparent flexible sheets printed in different complementary colors.

3. A demonstration-picture for multicolor-printing, comprising an opaque foundation-board printed in one of the complementary colors, and a plurality of superposed transparent flexible sheets printed in the other complementary colors.

4. A demonstration-picture for multicolor-printing, comprising an opaque foundation-board, a plurality of superposed transparent flexible sheets provided with color-prints in complementary colors, and means for attaching said sheets to said foundation-board so as to permit said color-prints to be placed in or out of register with each other.

In testimony that I claim the foregoing as my invention I have signed my name in presence of two subscribing witnesses.

BERNHARD LUDWIG.

Witnesses:
PAUL GOEPEL,
HENRY J. SUHRBIER.